US012298382B1

(12) United States Patent
Wang

(10) Patent No.: US 12,298,382 B1
(45) Date of Patent: May 13, 2025

(54) REAL-TIME DEFORMATION ADJUSTMENTS FOR PHASED ANTENNA ARRAY

(71) Applicant: CAES SYSTEMS LLC, Arlington, VA (US)

(72) Inventor: Yujia Wang, San Diego, CA (US)

(73) Assignee: CAES Systems LLC, Arlington, VA (US)

(*) Notice: Subject to any disclaimer, the term of this patent is extended or adjusted under 35 U.S.C. 154(b) by 322 days.

(21) Appl. No.: 17/856,739

(22) Filed: Jul. 1, 2022

(51) Int. Cl.
    *G01S 13/58* (2006.01)
    *G01S 13/06* (2006.01)

(52) U.S. Cl.
    CPC ............ *G01S 13/582* (2013.01); *G01S 13/06* (2013.01)

(58) Field of Classification Search
    CPC ............................... G01S 13/582; G01S 13/06
    USPC ........................................................... 342/156
    See application file for complete search history.

(56) References Cited

U.S. PATENT DOCUMENTS

| | | | | |
|---|---|---|---|---|
| 5,623,270 A * | 4/1997 | Kempkes | ............. | H01Q 3/2694 342/174 |
| 6,333,712 B1 * | 12/2001 | Haugse | ................... | H01Q 1/005 342/368 |
| 7,460,067 B2 * | 12/2008 | Allen | ..................... | H01Q 19/12 342/368 |
| 8,527,193 B1 * | 9/2013 | Brennan | ................. | F42B 15/01 73/514.01 |
| 8,930,047 B2 * | 1/2015 | Robinson | ............... | H01Q 21/06 342/359 |
| 2007/0194982 A1 * | 8/2007 | Stove | ..................... | H01Q 1/005 342/174 |

OTHER PUBLICATIONS

"Brand Guide for Bluetooth Trademarks," No. author given; published by the Bluetooth Special Interest Group; Kirkland, WA, USA; posted on the Internet at bluetooth.com. (Year: 2022).*
"WiMAX Forum Trademark Policy and Trademark Usage Guidelines," no author given; published by the WiMAX Forum; Clackamas, WA, USA.; dated in the year 2007. (Year: 2007).*
"Who We Are: Our Brands," no author given; published by the Wi-Fi Alliance; Austin, TX, USA; copyright in the year 2024. (Year: 2024).*
"Guidance for use of the LTE logo," no author given; published by the 3GPP Partners; Sophia Antipolis, France; retrieved on Jan. 3, 2025. (Year: 2025).*

* cited by examiner

Primary Examiner — Bernarr E Gregory
(74) Attorney, Agent, or Firm — Alston & Bird LLP

(57) ABSTRACT

A phased array computing system can include a mounting surface with a plurality of antenna disposed thereon. The mounting surface can include motion sensors disposes at a plurality of different sensor positions to detect the changes to the mounting surface. The system can receive motion data generated by the motion sensors. The system can compute, based on the motion data location offsets for the motion sensors from their original positions on the mounting surface. The system can compute a deformed position for each antenna on the mounting surface using the location offsets for the motion sensors. The system can update, based on the deformed positions, a signal model associated with the antennas to compensate for deformations at the mounting surface during sensor processing.

20 Claims, 11 Drawing Sheets

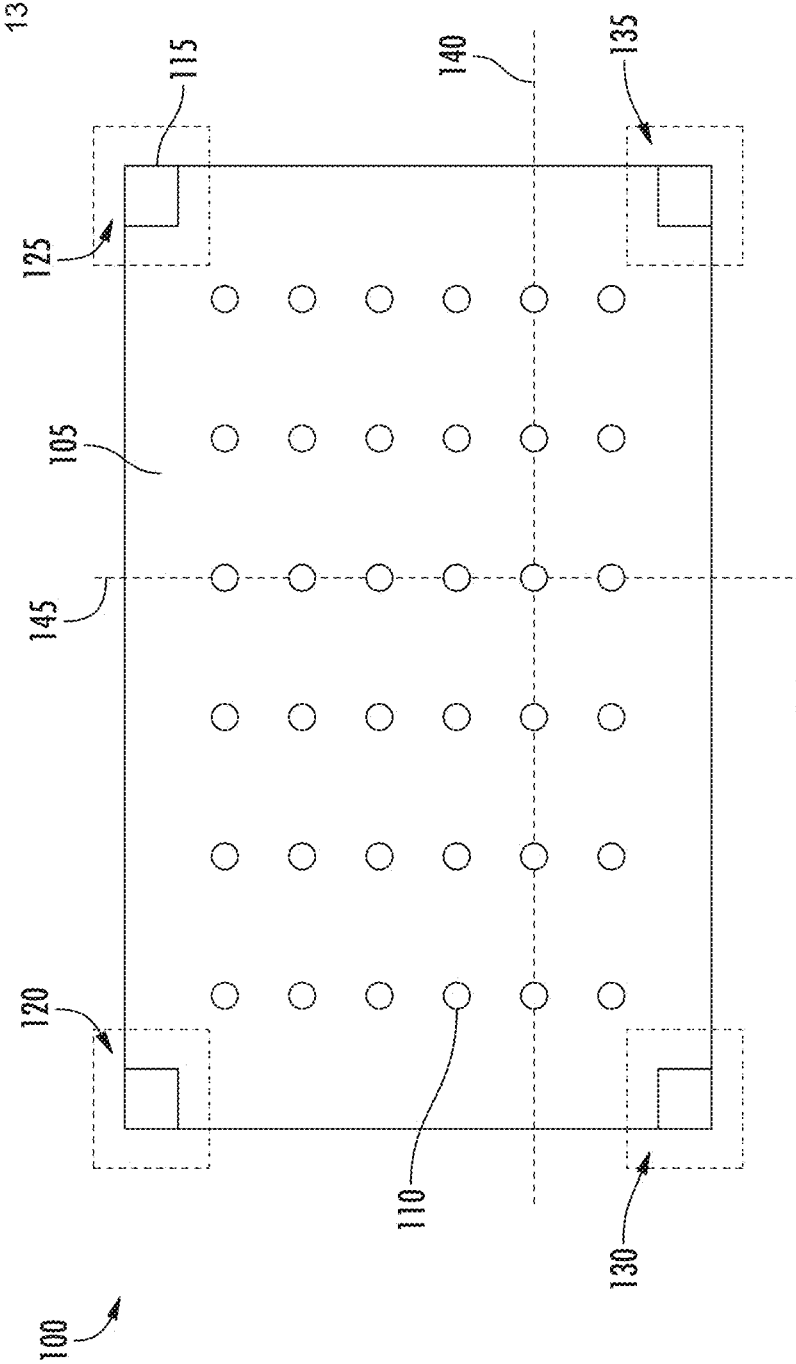

REAL-TIME DEFORMATION ADJUSTMENTS FOR PHASED ANTENNA ARRAY

TECHNICAL FIELD

The disclosed embodiments relate generally to antenna technology, including but not limited to methods and systems for accounting for antenna positional discrepancies in phased antenna arrays.

BACKGROUND

Multiple antenna elements are often connected to work as a single antenna or an antenna array for receiving or transmitting radio waves. In such an antenna or antenna array, individual antenna units are controlled with correlated phases to create a steerable beam of radio waves pointing in different directions without moving the antenna array. These "phased array systems" often require the precise placements of a large number of antenna elements on a mounting surface. Accurate positions of the antenna elements subsequently enable an entire class of array processing algorithms such as digital beamforming and high precision direction finding. In real world applications, however, a mounting surface can be subjected to physical perturbations such as shock, vibration, temperature, or motion that can result in different positional offsets for each of the antenna elements. If unaccounted for, an array processing algorithm will inherit positional errors, and incur performance degradations.

BRIEF SUMMARY

Various embodiments described herein relate to methods, apparatuses, and systems for the real-time deformation adjustments for phased antenna arrays.

In accordance with various examples of the present disclosure, a computing system comprises a mounting surface, at least one processor, and at least one memory coupled to the at least one processor. The mounting surface comprising an antenna disposed at an antenna position of the mounting surface and a motion sensor disposed at a sensor position of the mounting surface. The processor is configured to receive motion data generated by the motion sensor. The processor is configured to compute, based on the motion data, a location offset for the motion sensor from the sensor position of the mounting surface. The processor is configured to compute a deformed position of the antenna based on the location offset for the motion sensor. The processor is configured to update, based on the deformed position, a signal model associated with the antenna.

In some embodiments, computing the deformed position comprises computing an affine transformation matrix for the mounting surface based on the sensor position and the location offset for the motion sensor.

In some embodiments, computing the deformed position further comprises computing a homography transformation matrix for the mounting surface based on the sensor position and the location offset for the motion sensor.

In some embodiments, computing the deformed position further comprises computing the deformed position of the antenna using a combination of the affine transformation matrix and the homography transformation matrix.

In some embodiments, the mounting surface comprises a plurality of motion sensors, each disposed at a respective sensor position of a plurality of sensor positions on the mounting surface.

In some embodiments, the mounting surface defines a two-dimensional surface and each of the plurality of sensor positions are equally separated at an exterior portion of the two-dimensional surface.

In some embodiments, the mounting surface defines a three-dimensional surface and the plurality of sensor positions comprise one or more exterior sensor positions, one or more center sensor positions, and one or more interior sensor positions between the one or more center sensor positions and the one or more exterior sensor positions.

In some embodiments, computing the deformed position of the antenna based on the location offset for the motion sensor comprises computing a homography transformation for the mounting surface by applying a feature matching algorithm to the plurality of sensor positions and a respective offset of each of the plurality of motion sensors from a respective sensor position.

In some embodiments, the mounting surface is associated with a phased antenna array comprising a plurality of antennas, each disposed at a respective antenna position on the mounting surface.

In some embodiments, the processor is configured to modify a phased array signal processing algorithm using the signal model to account for the deformed position of the antenna.

In some embodiments, the phased array signal processing algorithm comprises a signal transmission algorithm configured to control a directionality of a radio transmission.

In some embodiments, the phased array signal processing algorithm comprises a signal reception algorithm configured to control a directionality of a radio reception.

In some embodiments, the phased array signal processing algorithm comprises at least one of: (i) a direction of departure algorithm; or (ii) a direction of arrival algorithm.

In accordance with various examples of the present disclosure, an antenna array is provided. The antenna array comprises a mounting surface, a plurality of antennas disposed on the mounting surface, a plurality of motion sensors disposed on the mounting surface, and signal processing circuitry configured to process radio signals based on motion data generated by the plurality of motion sensors.

In some embodiments, the plurality of motion sensors comprise a plurality of inertial measurement units, each comprising at least one of: (i) an accelerometer, (ii) a gyroscope, or (iii) a magnetometer.

In some embodiments, the motion data is indicative of a deformation of the mounting surface.

In some embodiments, the mounting surface defines a two-dimensional surface with at least four corners and the plurality of motion sensors comprise at least one motion sensor located at each of the at least four corners.

In some embodiments, the mounting surface defines a three-dimensional surface with an exterior portion and a center portion. The plurality of motion sensors comprise at least one motion sensor located within the exterior portion and at least one motion sensor located within the center portion.

In accordance with various examples of the present disclosure, a method is provided. The method includes receiving motion data generated by a motion sensor. The method includes computing, based on the motion data, a location offset for the motion sensor from a sensor position on a mounting surface. The method includes computing a deformed position for an antenna disposed on the mounting surface based on the location offset for the motion sensor. The method includes updating, based on the deformed position, a signal model associated with the antenna.

In some embodiments, computing the deformed position for the antenna disposed on the mounting surface based on the location offset for the motion sensor comprises computing an affine transformation for the mounting surface based on the sensor position and the location offset for the motion sensor from the sensor position on the mounting surface, computing a homography transformation for the mounting surface based on the sensor position and the location offset for the motion sensor from the sensor position on the mounting surface, and computing the deformed position of the antenna based on a combination of the affine transformation and the homography transformation.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the subject matter described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features as the person of skill in this art will appreciate upon reading this disclosure.

FIGS. 1A-B illustrate exemplary antenna arrays, in accordance with some embodiments of the present disclosure;

Figure 1B:
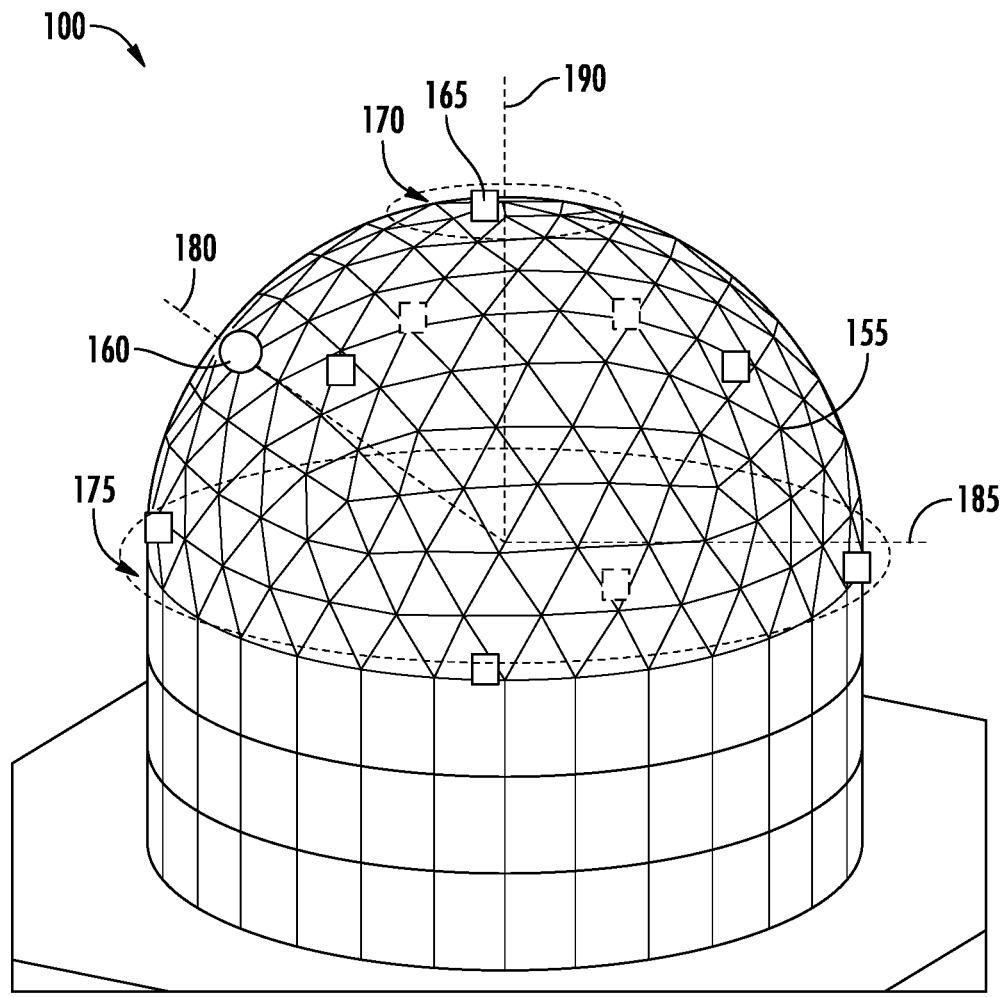

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

In some embodiments of this application, an antenna array includes a mounting surface with a plurality of antennas and motion sensors disposed thereon. The plurality of antennas is respectively placed at particular antenna positions on the mounting surface. The plurality of motion sensors is respectively placed at particular sensor positions on the mounting surface. At times, the mounting surface can be subjected to forces that cause the mounting surface to deform. Consequently, the respective positions of each of the plurality of antennas placed on the mounting surface can change, which can impact the reception, transmission, and interpretation of radio signals using the antenna array.

The antenna array can include signal processing circuitry that compensates for potential deformations of the mounting surface by processing radio signals using motion data generated by the plurality of motion sensors. The motion data can include real-time relative angular offsets that can be used to digitally compute a transformations including, for example, affine and/or homography transformation matrices, for the mounting surface. Using the transformations, the sensor processing circuitry can compute a deformed position for each antenna of the antenna array that captures the positional offset each antenna from its original antenna position. The sensor processing circuitry can update, based on the deformed positions, a signal model associated with the antenna array. The updated signal model can be used in real time as a correction term in any array processing technique to account for deformations to the mounting surface of the antenna array. This can enable precise signal processing in harsh conditions and can reduce material requirements (e.g., rigidity, weight, etc.) for antenna arrays.

FIGS. 1A-B illustrate exemplary antenna arrays, in accordance with some embodiments of the present disclosure. FIG. 1A depicts an example two-dimensional antenna array 100. FIG. 1B depicts an example three-dimensional antenna array 150. It is noted that the techniques described herein are not confined to the example two-dimensional antenna array 100 and example three-dimensional antenna array 150 depicted herein and are applicable to any two-dimensional antenna arrays, three-dimensional antenna arrays, as well as linear antenna arrays and any other antenna configurations not explicitly depicted herein.

The two-dimensional antenna array 100 can include a mounting surface 105. The mounting surface 105 can include any rigid and/or semi-rigid material forming a two-dimensional surface. A location on the mounting surface 105, for example, can be defined by a two-dimensional coordinate system including an x-axis 140 and a y-axis 145.

In some embodiments, the mounting surface 105 can define a two-dimensional surface with at least four corners. For instance, the two-dimensional surface can define a rectangular surface with a first corner 120, a second corner 125, a third corner 130, and/or a fourth corner 135. While a rectangular surface is illustrated by FIG. 1A, it is noted that the techniques described herein are applicable to any two-dimensional surface including, for example, surfaces that are triangular, circular, etc.

The mounting surface 105 can include antenna units (e.g., described in detail in FIGS. 8A-B) for mounting one or more antenna thereto. The mounting surface 105 can be associated with a phased antenna array including a plurality of antenna, each disposed at a respective position (e.g., with original coordinates x, y) of the mounting surface 105. For instance, the two-dimensional antenna array 100 can include a plurality of antennas (e.g., antenna 110) disposed (e.g., placed, mounted, etc.) on the mounting surface 105. Each antenna can be disposed at a respective antenna position of the mounting surface 105.

Depending on the material, use of, and/or surrounding environment of the two-dimensional antenna array 100, a respective antenna position of an antenna can change in a real-time and/or periodically over time, for example, due to deformations of the mounting surface 105. To prevent movement of an antennas on the mounting surface, conventional antenna arrays are implemented on rigid, durable, and heavy mounting surfaces that are resistant to deformation. However, even these mounting surfaces can be subject to change due to environmental factors that can cause vibration, compression, thermal expansion, and/or other, sometimes non-uniform deformations.

To account for such changes, the two-dimensional antenna array 100 is augmented with a plurality of motion sensors (e.g., motion sensor 115) disposed (e.g., placed, mounted, etc.) on the mounting surface 105. The plurality of motion sensors can include any sensor capable of detecting relative movement of the mounting surface 105. In some embodiments, the motion sensors can include a plurality of inertial measurement units. As examples, each motion sensor can include at least one of: (i) an accelerometer, (ii) a gyroscope, (iii) a magnetometer, etc. The motion sensors can generate motion data (e.g., indicative of an angular velocity, acceleration, magnetic field changes, etc.) indicative a real-time movement of at least a portion of the mounting surface 105.

The plurality of motion sensors are placed (e.g., disposed, mounted, etc.) at one or more different sensor positions on the mounting surface 105. The number and position of the plurality of motion sensors can be determined based on the shape of the mounting surface, historical deformation data, and/or any information descriptive of the probability of changes to the mounting surface 105. In some embodiments, the number and/or position of the plurality of motion sensors can be determined based on one or more characteristics of an upcoming use (e.g., an upcoming flight, upcoming weather, etc.) of the two-dimensional antenna array 100.

In some embodiments, the plurality of sensor positions can be equally separated at an exterior portion of the two-dimensional surface defined by the mounting surface 105. As one exemplary embodiment, the mounting surface 105 can include at least one motion sensor located at each of the at least four corners of the two-dimensional surface. For instance, the mounting surface can include a first motion sensor located proximate to the first corner 120, a second motion sensor (e.g., motion sensor 115) located proximate to the second corner, a third motion sensor located proximate to the third corner 130, and/or a fourth motion sensor located proximate to the fourth corner 135.

Turning to FIG. 1B, the three-dimensional antenna array 150 can include a mounting surface 155. The mounting surface 155 can include any rigid and/or semi-rigid material forming a three-dimensional surface. A location on the three-dimensional mounting surface 155, for example, can be defined by a three-dimensional coordinate system including an x-axis 180, a y-axis 185, and a z-axis 190.

In some embodiments, the mounting surface 155 can define a dome shaped three-dimensional surface with a center portion 170 (e.g., a dome peak) and an exterior portion 175 (e.g., a dome base). While illustrated as a rounded surface, it is noted that the techniques described herein are applicable to any three-dimensional surface including, for example, surfaces that are triangular, rectangular, etc.

The mounting surface 155 can include antenna units (e.g., described in detail in FIGS. 8A-B) for mounting one or more antennas thereto. For instance, the three-dimensional antenna array 150 can include a plurality of antennas (e.g., antenna 160) disposed (e.g., placed, mounted, etc.) on the mounting surface 105. Each antenna can be disposed at a respective antenna position (e.g., with original coordinates x, y, z) of the mounting surface 155. As described herein, depending on the material, use of, and/or surrounding environment of the three-dimensional antenna array 150, the respective antenna position of an antenna can change in real-time and/or periodically over time.

To account for such changes, the three-dimensional antenna array 150 is augmented with a plurality of motion sensors (e.g., motion sensor 165) disposed (e.g., placed, mounted, etc.) on the mounting surface 155. The plurality of motion sensors can be located at one or more different sensor positions (e.g., with original coordinates x, y, z) on the mounting surface. The number and position of the plurality of motion sensors can be determined based on the shape of the mounting surface, historical deformation data, and/or any information descriptive of the probability of changes to the mounting surface 155. In some embodiments, the number and/or position of the plurality of motion sensors can be determined based on one or more characteristics of an upcoming use (e.g., an upcoming flight, upcoming weather, etc.) of the three-dimensional antenna array 150.

In some embodiments, the plurality of sensor positions can include one or more exterior sensor positions, center sensor positions, and/or interior sensor positions between the center sensor positions and the exterior sensor positions. As one exemplary embodiment, the mounting surface 155 can include at least nine motion sensors. The motion sensors can include one or more motion sensors (e.g., one, etc.) located within (and/or proximate to) the center portion 170 of the mounting surface 155, one or more motion sensors (e.g., four, etc.) located within (and/or proximate to) the exterior portion 175 of the mounting surface 155, and/or one or more motion sensors (e.g., four, etc.) located at one or more positions between the center portion 170 and the exterior portion 175.

The two-dimensional antenna array 100 and/or the three-dimensional antenna array 150 can include signal processing circuitry configured to process radio signals received and/or transmitted by the plurality of antennas (and/or antenna units thereof) of the respective arrays based on motion data generated by the plurality of motion sensors (e.g., motion sensor(s) 115, 165). The signal processing circuitry can correspond to a particular antenna (e.g., an antenna unit) of the plurality of antennas, or, in some embodiments, the signal processing circuitry can include a central processing circuitry communicatively connected to each of the plurality of antennas and/or motion sensors of the antenna array.

Figure 2:
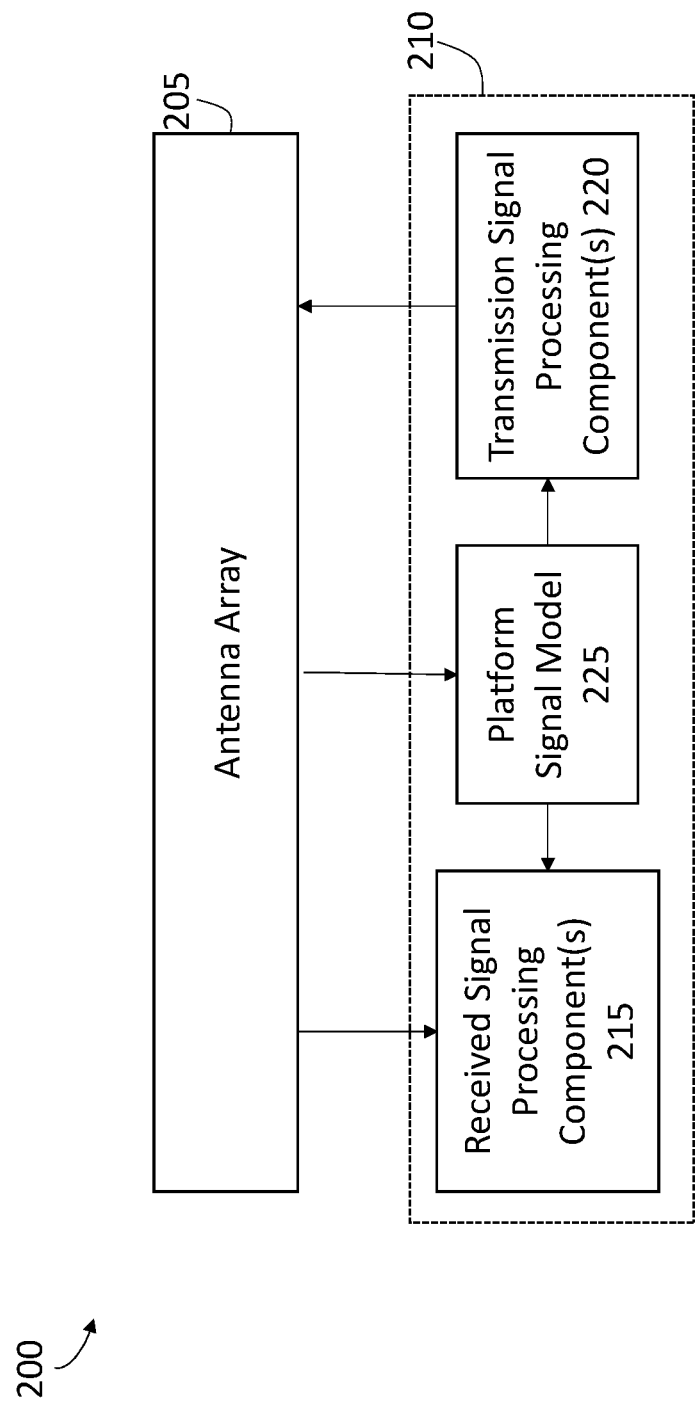
FIG. 2 illustrates an exemplary data flow diagram for signal processing circuitry, in accordance with some embodiments of the present disclosure.

FIG. 2 illustrates an exemplary data flow diagram 200 for signal processing circuitry, in accordance with some embodiments of the present disclosure. The data flow diagram 200 depicts the flow of data between an antenna array 205 such as, for example, the two-dimensional antenna array 100 and/or the three-dimensional antenna array 150 of FIGS. 1A-B and signal processing circuitry 210 configured to process radio signals received and/or transmitted by the antenna array 205. As described herein, the antenna array 205 can receive and/or transmit a plurality of radio signals using a plurality of antennas disposed at a plurality of antenna positions on a mounting surface of the antenna array 205.

At reception, radio signals can be processed by one or more received signal processing component(s) 215 to generate received radio data (e.g., analog representations, digital representations, etc.) representative of the one or more received radio signals. The received signal processing component(s) 215 can include, for example, one or more radio signal processing algorithms configured to interpret raw radio signals and generate received radio data indicative of one or more characteristics (e.g., wavelength, directionality, strength, etc.) of the radio signals. The radio signal processing algorithms, for example, can include phased array processing algorithms (e.g., one or more beamforming techniques, etc.) for interpreting radio signals received by a plurality of antennas of the antenna array 205.

At transmission, transmission radio data can be processed by one or more transmission signal processing component(s) 220 to generate one or more instructions for transmitting radio signals using the plurality of antennas of the antenna array. The one or more transmission signal processing component(s) 220 can include radio signal processing algorithms configured to compute one or more characteristics (e.g., a timing, wavelength, directionality, etc.) to perform a radio transmission. For example, the radio processing algorithms can include phased array processing algorithms (e.g., one or more beamforming techniques, etc.) for computing instructions for transmitting desired radio signals using the plurality of antennas of the antenna array 205.

The received signal processing component(s) 215 and/or the transmission signal processing component(s) 220 can determine one or more outputs based on the characteristics of the antenna array 205 such as, for example, the relative position of each antenna on the mounting surface of the antenna array 205. Conventional phased array systems can require precise placements of a large number of antenna on a rigid surface. Accurate positions of the antenna can subsequently enable the accurate performances of the received signal processing component(s) 215 and/or the transmission signal processing component(s) 220. Accurate antenna positions can be accounted for by platform signal model(s) 225 (e.g., a steering vector, etc.) that represent the relationship (e.g., physical, etc.) between the plurality of antenna of the antenna array 205.

A mounting surface for the antenna array 205 can be subjected to real-time physical perturbations such as shock, vibration, temperature, and/or platform motion that can result in a different positional offset for each of the antennas of the antenna array 205. For example, the antenna array 205 can be configured on a vehicle surface such as an aircraft, ship, etc. Movement of the antenna array 205 (e.g., via the aircraft, ship, etc.) can result in physical distortions of the mounting surface of the antenna array 205. In addition, or alternatively, such distortions can be caused by environmental factors such as weather in moving or non-moving embodiments. At times, these distortions can be exasperated in lighter phased array embodiments (e.g., on light aircraft such as drones, etc.), where the mounting surface may be more susceptible to physical perturbations.

If unaccounted for, the received signal processing component(s) 215 and/or the transmission signal processing component(s) 220 can inherit positional errors and incur performance degradation. To increase the performance of the received signal processing component(s) 215 and/or the transmission signal processing component(s) 220, the signal processing circuitry 210 can receive motion data from one or more motion sensors of the antenna array 205 and utilize computer vision techniques (e.g., affine transformation matrices, homomorphic transformation matrices, etc.) to quantify the deformation of a mounting surface based on the motion data. For example, the motion data can include real-time relative angular offsets for motion sensors disposed on the mounting surface of the antenna array 205. The real-time angular offsets can be used to compute an affine and/or homomorphic transformation matrices for the mounting surface of the antenna array 205. For each antenna of the antenna array 205, the affine and/or homomorphic transformation matrices can be used, in combination with each antenna's original position, to represent the antenna's deformed position in the platform signal model 225. In the context of phased array embodiments, the deformed positions of the antenna of the antenna array 205 under planar distortion can be translated (e.g., using the platform signal model 225) into amplitude, phase, and/or frequency offsets and compensated for through a reformulation of the array processing algorithms (e.g., received signal processing component(s) 215, the transmission signal processing component(s) 220, etc.).

Figure 3:
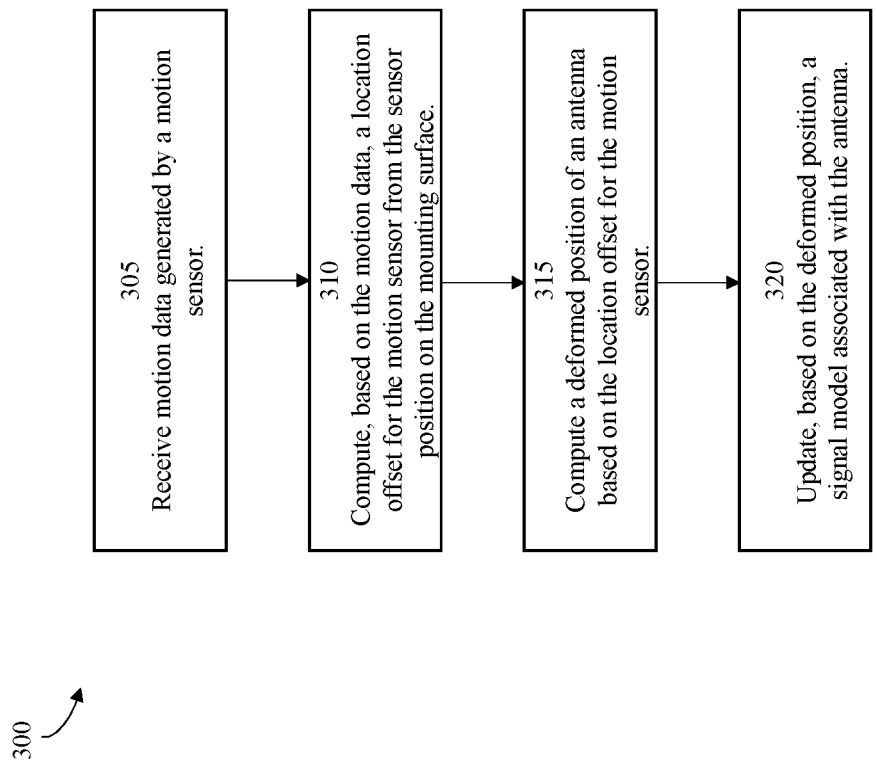
FIG. 3 illustrates a flowchart depicting example operations for processing antenna array radio signals, in accordance with some embodiments of the present disclosure.

FIG. 3 illustrates a flowchart depicting example operations 300 for processing antenna array radio signals, in accordance with some embodiments of the present disclosure. In some examples, the example operations 300 can be performed by various computing system components (for example, but not limited to, signal processing circuitry 210 of an antenna array described above with regard to FIG. 2). In some examples, the computing system components can include processing circuitry that can be electrically coupled to and/or in electronic communication with other circuitries, such as, but not limited to, one or more antenna units, motion sensors, etc. of an antenna array.

At (305), the operations 300 can include receiving motion data generated by a motion sensor. For example, a computing system (e.g., processing circuitry of an antenna array, a remote computing device communicatively connected one or more components of the antenna array, etc.) can receive motion data generated by a motion sensor of the antenna array. The motion data can be indicative of a movement (e.g., acceleration, force, etc.) of the motion sensor of the antenna array. In some embodiments, the antenna array can include a plurality of motion sensors. The motion data can be indicative of the movement of each motion sensor of the antenna array.

At (310), the operations 300 can include computing, based on the motion data, a location offset for the motion sensor from a sensor position on the mounting surface. For example, the computing system can compute, based on the motion data, the location offset for the motion sensor from the sensor position on the mounting surface.

For instance, the computing system can include a mounting surface that includes at least one motion sensor disposed at a sensor position on the mounting surface. In some embodiments, the mounting surface can be defined by a two- or three-dimensional coordinate system. The sensor position can be expressed as two- (e.g., denoted as x, y) or three- (e.g., denoted as x, y, z) dimensional coordinates. The sensor position can include an original position (e.g., a position of the motion sensor at setup) of the motion sensor.

The sensor position can change in response to a change in the mounting surface. For example, the sensor position can change in response an expansion (e.g., dilation), compression, translation, rotation, shear, flex, bend, twist, and/or other deformation (e.g., uniform, or non-uniform) of the mounting surface that can result from external environmental factors (e.g., weather, heat, etc.), movement of a base vehicle (e.g., aircraft, ship, etc.) associated with the antenna array, internal factors (e.g., heat from an engine of a base vehicle, etc.) associated with the antenna array, and/or the like. The motion data can be indicative of the change to (e.g., a deformation of) the mounting surface.

The computing system can compute, using the motion data from the motion sensor, the location offset for the motion sensor from the motion sensor's original position, for example, due to geometrical changes to the mounting surface. The computing system can apply the location offset to the motion sensor's original position to compute a deformed sensor position. The deformed sensor position can be represented as a second set of two—(e.g., denoted as $\hat{x}$, $\hat{y}$) or three—(e.g., denoted as $\hat{x}$, $\hat{y}$, $\hat{z}$) dimensional coordinates.

In some embodiments, the antenna array can include a mounting surface that includes a plurality of motion sensors. Each motion sensor can be disposed at a respective sensor position of a plurality of sensor positions on the mounting surface. The motion data can be indicative of each respective motion sensor's location offset from its respective sensor position on the mounting surface. The respective offsets can be applied to each motion sensor's original sensor position to compute a deformed sensor position for each motion sensor disposed on the mounting surface.

At (315), the operations 300 can include computing a deformed position of an antenna based on the location offset for the motion sensor. For example, the computing system can compute the deformed position of the antenna based on the location offset for the motion sensor. For instance, the mounting surface of the antenna array can include an antenna disposed at an antenna position on the mounting surface. The antenna position can be expressed as two- (e.g., denoted as $x_l$, $y_l$) or three- (e.g., denoted as $x_l$, $y_l$, $z_l$) dimensional coordinates. The antenna position can include an original position (e.g., a position of the antenna at setup, etc.) of the antenna on the mounting surface. The antenna position can change in response to a change in the mounting surface. As described herein, the computing system can implement computer vision techniques to extrapolate the deformed position of the antenna, for example, due to geometrical changes to the mounting surface, based on the location offset for the motion sensor.

In some embodiments, the antenna array can include a mounting surface that includes a plurality of antennas. Each antenna can be disposed at a respective antenna position of a plurality of antenna positions on the mounting surface. The computing system can utilize the location offset(s) for the motion sensor(s) of the antenna array and each antenna's original position to compute a deformed position for each antenna disposed on the mounting surface.

In some embodiments, the deformed position for an antenna can be computed in response to the motion data. For instance, the computing system can detect motion data indicative of a deformation of the mounting surface. In response to the motion data, the computing system can compute the deformed position for the antenna using the techniques described herein. In addition, or alternatively, the deformed position for the antenna can be computed in response to one or more other stimuli including, for example, temperature changes, etc.

At (320), the operations 300 can include updating, based on the deformed position, a signal model associated with the antenna. For example, the computing system can update, based on the deformed position, the signal model associated with the antenna.

The signal model can include any algorithm for representing the relationship between radio signals and an antenna that receives and/or transmits the radio signals. The position of the antenna can include at least one input to the signal model. For instance, the signal model can include a steering vector for a phased antenna array that represents the set of phase delays a plane wave experiences as evaluated at a plurality of antennas of the phased antenna array. As one example, the steering vector for a two-dimensional phased array can be represented as:

$$x_l(t) = g_l(\theta) e^{-jk(x_l \cos\theta + y_l \sin\theta)} s(t)$$

where $\theta$ can represent a direction of a radio frequency wave, $s(t)$ represents a desired signal for the radio frequency wave, and $(x_l, y_l)$ represent the original coordinates of the $l^{th}$ antenna of a two-dimensional phased array. In some embodiments, the steering vector can include an additional coordinate $z_l$ to represent a third dimension of an antenna implemented in a three-dimensional phased array.

The computing system can input the deformed position of the antenna to the signal model to compensate for changes to the mounting surface of the antenna array. By way of example, the same steering vector for a two-dimensional phased array with a potentially deformed mounting surface can be represented as:

$$x_l(t) = g_l(\theta) e^{-jk(\hat{x}_l \cos\theta + \hat{y}_l \sin\theta)} s(t)$$

where $\hat{x}_l$ and $\hat{y}_1$ represent the deformed coordinates of the $l^{th}$ antenna of a two-dimensional phased array. In some embodiments, the steering vector can include an additional coordinate $\hat{z}_l$ to represent a third potentially deformed dimension of an antenna implemented in a three-dimensional phased array.

As described herein, the computing system can apply the updated signal model to a phased array signal processing algorithm to account for the deformed position of the antenna. For instance, a short-hand steering vector for each antenna in a phased antenna array can be denoted by the steering matrix:

$$\underline{x}(t) = \underline{g}(\theta) s(t).$$

The computing system can utilize one or more phased array signal processing algorithms to retrieve and/or enhance one or more different variables for the steering matrix by finding an optimal weight vector $\underline{w}^*$. The optimal weight vector can be solved as a numerical optimization problem using one or more received signal processing component(s) (e.g., one or more techniques for processing received signals as described herein) and/or transmission signal processing component(s) (e.g., one or more techniques for processing desired transmission signals as described herein). By way of example, the computing system can apply the one or more received signal processing component(s) to the steering matrix to find an optimal weight vector for enhancing (e.g., by reducing noise, etc.) s(t). In addition, or alternatively, the computing system can apply one or more transmission signal processing component(s) to the steering matrix to find an optimal weight vector for enhancing g(θ).

Figure 4:
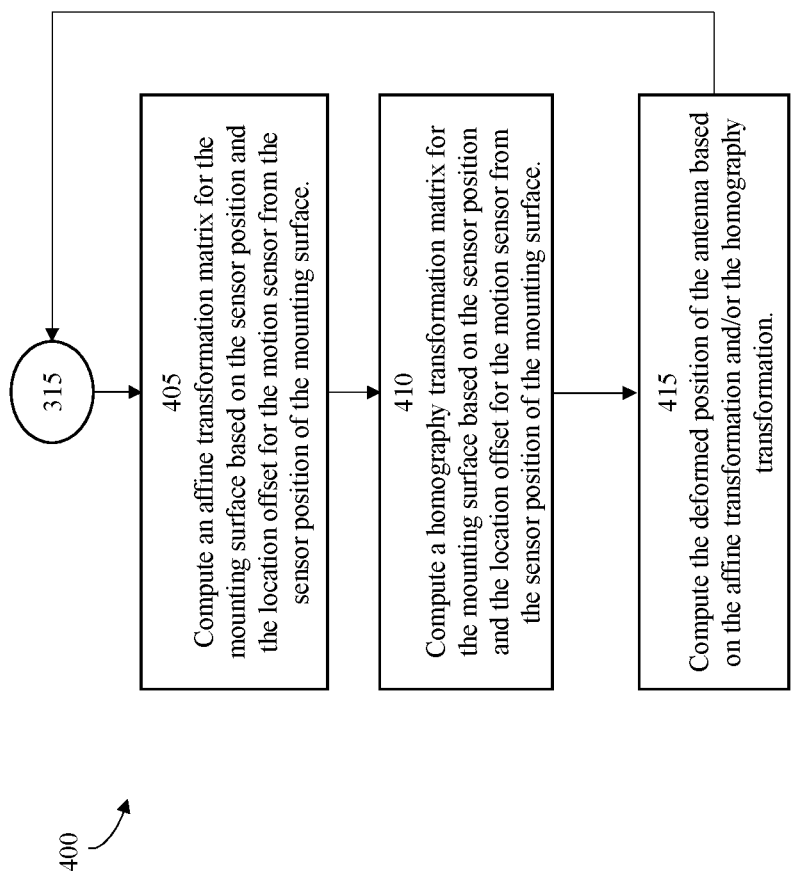
FIG. 4 illustrates a flowchart depicting example operations for computing a deformed position of an antenna, in accordance with some embodiments of the present disclosure.

FIG. 4 illustrates a flowchart depicting example operations 400 for computing a deformed position of an antenna, in accordance with some embodiments of the present disclosure. In some examples, the example operations 400 can be performed by various computing system components (for example, but not limited to, signal processing circuitry 210 of an antenna array described above with regard to FIG. 2). In some examples, the computing system components can include processing circuitry that can be electrically coupled to and/or in electronic communication with other circuitries, such as, but not limited to, one or more antenna units, motion sensors, etc. of an antenna array.

The operations 400 can include sub-operations of operation 315 of FIG. 3, where the operations include computing a deformed position for the antenna based on the location offset for a motion sensor.

At (405), the operations 400 can include computing a first transformation matrix for a mounting surface of an antenna array. For example, a computing system (e.g., the processing circuitry of the antenna array, a remote computing device communicatively connected to one or more components of the antenna array, etc.) can compute the first transformation matrix for the mounting surface of the antenna array.

The first transformation matrix can include an affine transformation matrix. The computing system can compute the affine transformation matrix for the mounting surface of the antenna array based on motion data received from a motion sensor disposed on the mounting surface of the antenna array. For instance, the computing system can compute the affine transformation matrix based on the motion sensor's original position and the location offset for the motion sensor from the motion sensor's original position on the mounting surface.

The affine transformation includes a projective transformation that preserves collinearity and ratios of distances between points and lines of the mounting surface. The affine transformation can be represented as an affine transformation matrix that can be applied to any point on the mounting surface to find the point's deformed position on a deformed mounting surface. For example, the affine transformation for a two-dimensional mounting surface can be represented as:

$$\begin{bmatrix} \hat{x} \\ \hat{y} \end{bmatrix} = \begin{bmatrix} a & b \\ c & d \end{bmatrix} \begin{bmatrix} x \\ y \end{bmatrix} + \begin{bmatrix} t_x \\ t_y \end{bmatrix}$$

where the matrix $$\begin{bmatrix} a & b \\ c & d \end{bmatrix}$$

is the affine transformation, x and y are the original coordinates of the point and $\hat{x}$ and $\hat{y}$ are the deformed coordinates of the point. $t_x$ and $t_y$ Can include translation terms that can be adjusted based on the circumstance.

The computing system can compute the affine transformation matrix using the original position, (x, y), and the deformed position, $(\hat{x}, \hat{y})$ of the motion sensor. For example, the mounting surface can include a plurality of motion sensors originally placed at a plurality of sensor positions $(x_s, y_s)$ on the mounting surface. The computing system can compute a plurality of deformed sensor positions $(\hat{x}_s, \hat{y}_s)$ for each of the plurality of sensor positions and compute a separate equation for the mounting surface using a pair of original and deformed coordinates for each motion sensor. A systems of equations approach can be used to solve for the affine transformation matrix using the equations for each of the motion sensors disposed on the mounting surface.

In some embodiments, a signal model for the array configuration can be updated using the affine transformation matrix. For instance, the positions for each antenna of the array configuration can be represented as the affine transformation matrix in a steering vector, such as:

$$x_l(t) = g_l(\theta)e^{-jk\left(\begin{bmatrix} a & b \\ c & d \end{bmatrix}\begin{bmatrix} x \\ 0 \end{bmatrix}_l \cos\theta + \begin{bmatrix} a & b \\ c & d \end{bmatrix}\begin{bmatrix} 0 \\ y \end{bmatrix}_l \sin\theta\right)} s(t)$$

In this manner, the deformed position for each antenna in the array configuration can be accounted for by a signal model by applying the affine transformation matrix to the original coordinates of each respective antenna.

In some embodiments, the affine transformation can be used in response to a determination that the mounting surface is uniformly deformed (e.g., the original mounting surface is translated, dilated, rotated, and/or sheared).

At (410), the operations 400 can include computing a second transformation matrix for the mounting surface of the antenna array. For example, the computing system can compute the second transformation matrix for the mounting surface of the antenna array.

The second transformation matrix can include a homography transformation matrix. The computing system can compute the homography transformation matrix for the mounting surface based on motion data received from the motion sensor disposed on the mounting surface of the antenna array. For instance, the computing system can compute the homography transformation matrix based on the motion sensor's original position and the location offset for the motion sensor from the motion sensor's original position on the mounting surface.

The homography transformation matrix includes a perspective transformation that accounts for non-uniform distortions of the mounting surface. For instance, homomorphic filtering can include a concept where a mathematical matrix (e.g., a homography transformation matrix) can be utilized to map any coordinate on an undistorted surface to a new, deformed coordinate in a distorted mounting surface. The homography transformation can be represented as a homography transformation matrix that can be applied to any point on the mounting surface to find the point's deformed position on a deformed mounting surface. For example, a point's deformed position for a two-dimensional mounting surface can be represented as:

$$s\begin{bmatrix} \hat{x} \\ \hat{y} \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix}\begin{bmatrix} x \\ y \\ 1 \end{bmatrix}$$

where the matrix $$\begin{bmatrix} h_{11} & h_{12} & h_{13} \\ h_{21} & h_{22} & h_{23} \\ h_{31} & h_{32} & h_{33} \end{bmatrix}$$

is the homography transformation matrix, (x, y, 1) are the original coordinates of the point, ($\hat{x}$, $\hat{y}$, 1) are the deformed coordinates of the point. s can include a scaling factor that can be adjusted based on the circumstance.

The computing system can compute the homography transformation matrix using the original position, (x, y), and the deformed position, ($\hat{x}$, $\hat{y}$) of the motion sensor. For example, the mounting surface can include a plurality of motion sensors originally placed at a plurality of sensor positions ($x_s$, $y_s$) on the mounting surface. The computing system can compute a plurality of deformed sensor positions ($\hat{x}_s$, $\hat{y}_s$) for each of the plurality of sensor positions and compute a separate equation for the mounting surface using a pair of original and deformed coordinates for each motion sensor.

Feature matching techniques can be applied to the multiple equations (and/or intrinsic motion sensor characteristics, etc.) for each of the motion sensors disposed on the mounting surface to solve for the homography transformation matrix. For instance, the homography transformation matrix for the mounting surface can be computed by applying a feature matching algorithm to the plurality of sensor positions of the motion sensors and a respective offset for each of the plurality of motion sensors from a respective sensor position.

In some embodiments, a signal model for the array configuration can be updated using the homography transformation matrix. For instance, the positions for each antenna of the array configuration can be represented as the homography transformation matrix in a steering vector, such as:

$$x_l(t) = g_l(\theta)e^{-jk\left(\begin{bmatrix}h_{11} & h_{12} & h_{13}\\h_{21} & h_{22} & h_{23}\\h_{31} & h_{32} & h_{33}\end{bmatrix}\begin{bmatrix}x\\0\\1\end{bmatrix}_l \cos\theta + \begin{bmatrix}h_{11} & h_{12} & h_{13}\\h_{21} & h_{22} & h_{23}\\h_{31} & h_{32} & h_{33}\end{bmatrix}\begin{bmatrix}0\\y\\1\end{bmatrix}_l \sin\theta\right)} s(t)$$

In this manner, the deformed position for each antenna in the array configuration can be accounted for by the signal model by applying the homography transformation matrix to the original coordinates of each respective antenna.

The homography transformation matrix is illustrated herein for a two-dimensional mounting surface. It is noted that the same techniques can be applied to a three-dimensional mounting surface. For example, the homography matrix can be represented as:

$$s\begin{bmatrix}\hat{x}\\\hat{y}\\\hat{z}\end{bmatrix} = \begin{bmatrix}h_{11} & h_{12} & h_{13}\\h_{21} & h_{22} & h_{23}\\h_{31} & h_{32} & h_{33}\end{bmatrix}\begin{bmatrix}x\\y\\z\end{bmatrix}$$

for a three-dimensional mounting surface in which z and $\hat{z}$ can be indicative of third dimensional coordinate on the mounting surface.

At (415), the operations 400 can include computing the deformed position for the antenna based on the affine transformation and/or the homography transformation. For example, the computing system can compute the deformed position for the antenna based on the affine transformation and/or the homography transformation.

For instance, the computing system can compute the deformed position of the antenna for the mounting surface based on a combination of the affine transformation and the homography transformation for the mounting surface. By way of example, the computing system can compute the deformed position of the antenna by inputting the affine transformation and the homography transformation to an affine-homograph transformation algorithm to compute the deformed position for the antenna based on the antenna's original position. In some embodiments, a signal model for the array configuration can be updated using the affine-homography transformation algorithm. For instance, the positions for each antenna of the antenna array can be represented as the affine-homography transformation algorithm applied to the original position of a respective antenna.

Figure 5:
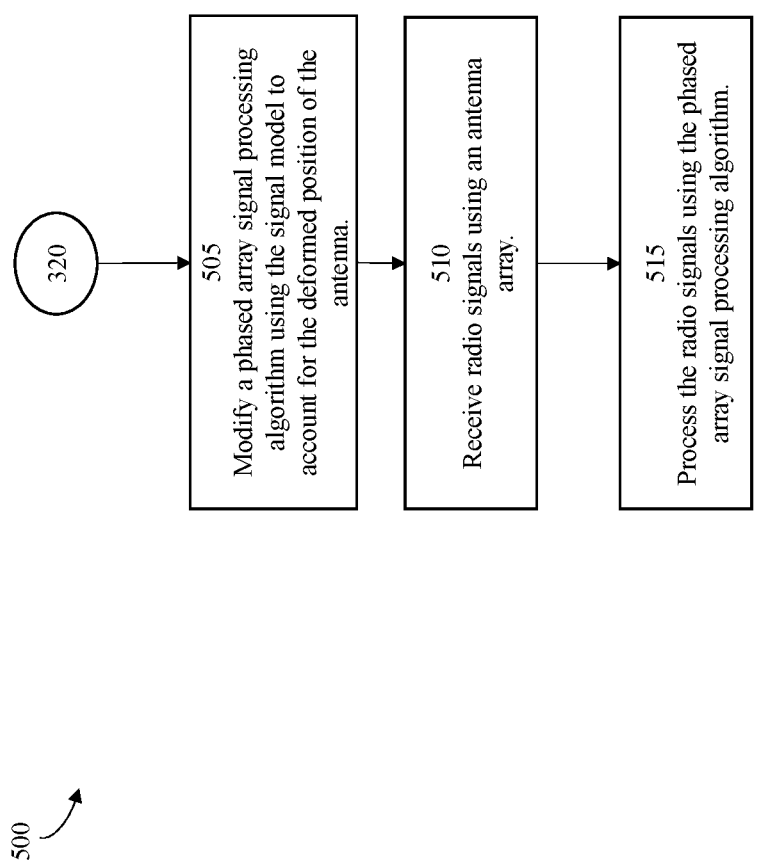
FIG. 5 illustrates a flowchart depicting example operations for accounting for a deformed position of an antenna, in accordance with some embodiments of the present disclosure.

FIG. 5 illustrates a flowchart depicting example operations 500 for accounting for a deformed position of an antenna, in accordance with some embodiments of the present disclosure. In some examples, the example operations 500 can be performed by various computing system components (for example, but not limited to, signal processing circuitry 210 of an antenna array described above with regard to FIG. 2). In some examples, the computing system components can include processing circuitry that can be electrically coupled to and/or in electronic communication with other circuitries, such as, but not limited to, one or more antenna units, motion sensors, etc. of an antenna array.

The operations 500 can include sub-operations and/or operations subsequent to operation 320 of FIG. 3, where the operations include updating, based on the deformed position, a signal model associated with the antenna.

At (505), the operations 500 can include modifying a phased array signal processing algorithm using the signal model to account for the deformed position of the antenna. For example, a computing system (e.g., the processing circuitry of the antenna array, a remote computing device communicatively connected to one or more components of the antenna array, etc.) can modify the phased array signal processing algorithm using the signal model to account for the deformed position of the antenna.

The phased array signal processing algorithm can include a signal reception algorithm configured to control a directionality of a radio reception and/or interpret one or more received radio signals. For example, the signal reception algorithm can include one or more beamforming techniques (e.g., digital beam forming, etc.) for filtering radio signals received by the antenna array and/or interpreting the received radio signals. In some embodiments, the phased array signal processing algorithm can include one or more algorithms for interpreting radio signals such as, for example, a direction of arrival algorithm and/or other signal processing algorithms for determining one or more characteristics (e.g., wavelength, directionality, strength, etc.) of radio signals received by the antenna array.

The computing system can apply the signal model to the phased array signal processing algorithm by converting the signal model to a covariance model and optimizing one or more variables of the covariance model. In some embodiments, the phased array signal processing algorithm can be used to compute one or more weights for optimizing a parameter of the signal model (e.g., s(t) as described herein) to determine a relationship between the radio signals received and a desired expression of the radio signals.

At (510), the operations 500 can include receiving radio signals using an antenna array. For example, the computing system can receive the radio signals using the antenna array. The radio signals can include returning signals that originated from the antenna array. In some embodiments, the radio signals can include external signals that originated from an external source.

At (515), the operations 500 can include processing the radio signals using the phased array signal processing algorithm. For example, the computing system can process the radio signals using the array signal processing algorithm to filter and/or interpret one or more characteristics of the received radio signals. The characteristics, for example, can identify the directionality, strength, wavelength, etc. of the received radio signals that account for the deformed positions for each antenna of the antenna array.

Figure 6:
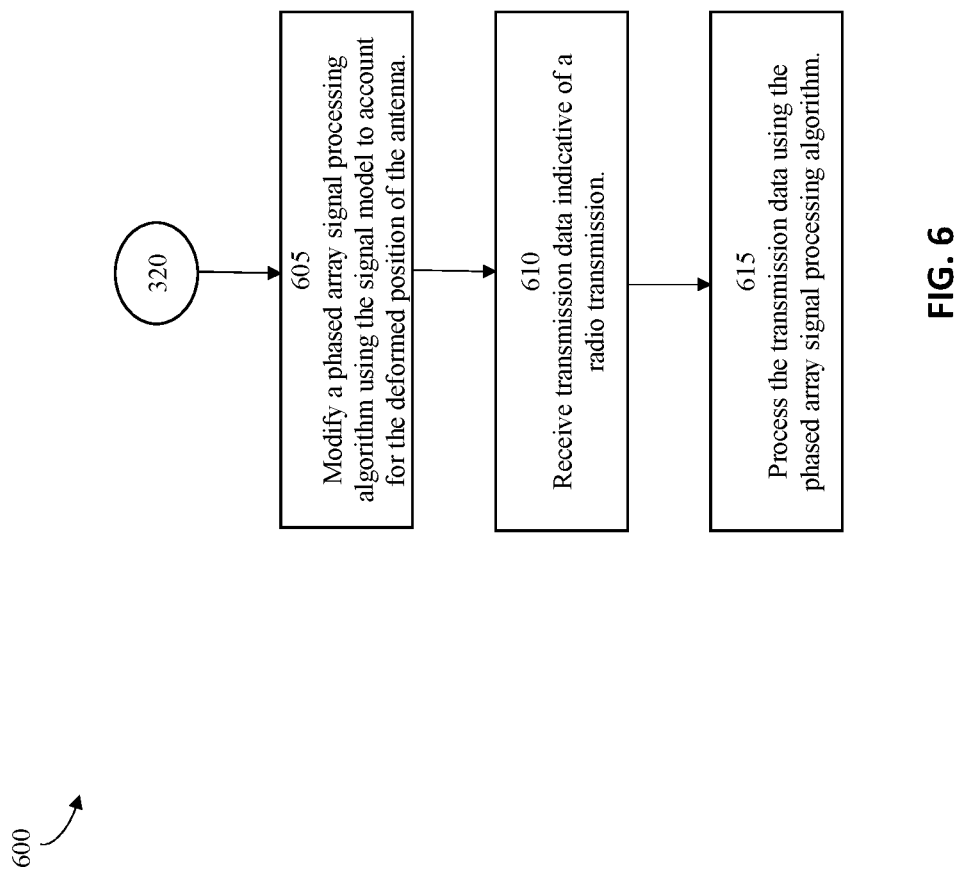
FIG. 6 illustrates a flowchart depicting example operations for accounting for a deformed position of an antenna, in accordance with some embodiments of the present disclosure.

FIG. 6 illustrates a flowchart depicting example operations 600 to account for a deformed position of an antenna, in accordance with some embodiments of the present disclosure. In some examples, the example operations 600 can be performed by various computing system components (for example, but not limited to, signal processing circuitry 210 of an antenna array described above with regard to FIG. 2). In some examples, the system components can include processing circuitry that can be electrically coupled to and/or in electronic communication with other circuitries, such as, but not limited to, one or more antenna units, motion sensors, etc. of an antenna array.

The operations 600 can include sub-operations and/or operations subsequent to operation 320 of FIG. 3, where the operations include updating, based on the deformed position, a signal model associated with the antenna.

At (605), the operations 600 can include modifying a phased array signal processing algorithm using the signal model to account for the deformed position of the antenna. For example, a computing system (e.g., the processing circuitry of the antenna array, a remote computing device communicatively connected to one or more components of the antenna array, etc.) can modify the phased array signal processing algorithm using the signal model to account for the deformed position of the antenna.

The phased array signal processing algorithm can include a signal transmission algorithm configured to control a directionality of a radio transmission and/or interpret one or more transmitted radio signals. In some embodiments, the phased array signal processing algorithm can include one or more algorithms for interpreting radio signals such as, for example, a direction of departure algorithm and/or other signal processing algorithms for determining one or more characteristics (e.g., wavelength, directionality, strength, etc.) for the transmission of desired radio signals. For example, the signal transmission algorithm can include one or more beamforming techniques (e.g., high precision direction finding, etc.) for finding a desired angle, timing, etc. of radio signal transmissions by the antenna array. In some embodiments, the phased array signal processing algorithm can include one or more algorithms for optimizing a transmission pattern for transmitting radio signals using the antenna array.

The computing system can apply the signal model to the phased array signal processing algorithm by converting the signal model to a covariance model and optimizing one or more variables of the covariance model. In some embodiments, the phased array signal processing algorithm can be used to compute one or more weights for optimizing a parameter of the signal model (e.g., $\theta$ as described herein) to optimize one or more characteristics of the transmission of radio signals using the antenna array.

At (610), the operations 600 can include receiving transmission data indicative of a radio transmission. For example, the computing system can receive transmission data indicative of the radio transmission. The transmission data can include one or more desired characteristics for the radio transmission such as, for example, a desired transmission angle, timing, etc.

At (615), the operations 600 can include processing transmission data using the phased array signal processing algorithm. For example, the computing system can process the transmission data using the phased array signal processing algorithm to generate one or more transmission instructions for achieving the desired characteristics. The transmission instructions, for example, can include one or more transmission patterns, angles, etc. that account for the deformed positions for each antenna of the antenna array.

Example Antenna Array

Figure 7:
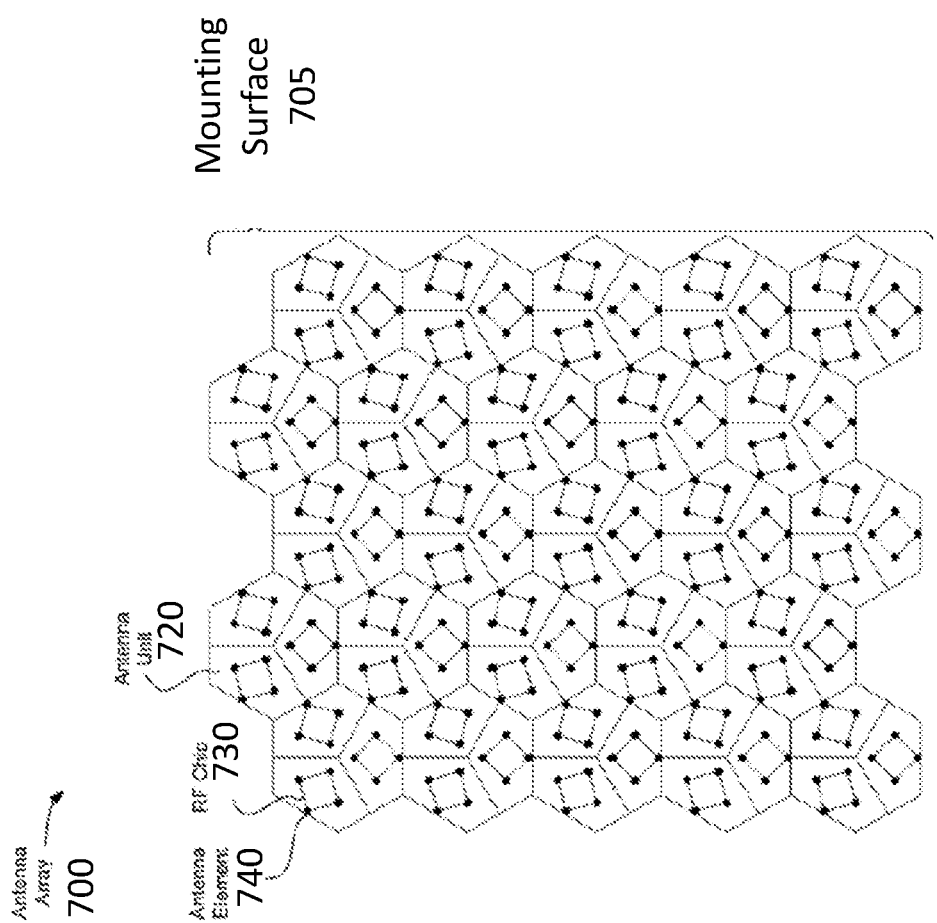
FIG. 7 is a top view of an example antenna array, in accordance with some embodiments.

FIG. 7 is a top view of an example antenna array 700, in accordance with some embodiments. The antenna array 700 includes a mounting surface 705 that can include an antenna board (e.g., a printed circuit board (PCB) (not shown) behind and/or underneath the mounting surface). The mounting surface 705 can include a plurality antenna units 720. The antenna units 720 can include at least one antenna element 740, an antenna circuit chip 730, and one or more ports. In some embodiments, the mounting surface 705 is flat (e.g., two-dimensional). Conversely, in some embodiments, the mounting surface 705 is curved in one or more dimensions (e.g., three-dimensional). In some embodiments, the antenna array 700 operates within one or more of a X-Band, Ku-Band, K-Band, Ka-Band, V-Band, and/or W-Band frequency range.

In some embodiments, the antenna array 700 has a scan angle up to +/−60° and a half power beam width (HPBW) less than 6° (theta 0=0°) when operating at the X-Band frequency. In some situations, the HPBW is less than 4° (theta 0=0°) when operating at the Ku-Band. In some situations, the HPBW is less than 3° (theta) 0-0° when operating at the K-Band frequency range. In some situations, the HPBW is less than 2° (theta 0=0°) when operating at the Ka-Band. In some situations, the HPBW is less than 1° (theta 0=0°) when operating at the W-Band.

In some embodiments, when the antenna array 700 operates at a given frequency, the antenna array 700 may select one or more of the antenna units to perform the desired operations (e.g., transmit radio waves and/or receive radio waves). The antenna units may be specifically configured to operate at a particular radio wave frequency and/or wavelength.

Each antenna unit 720 includes an antenna circuit chip 730, which includes one or more antenna elements. In some embodiments, each antenna unit 720 includes four antenna elements 740 disposed at four corners of the antenna circuit chip 730. In some embodiments, each antenna unit 720 includes one or more ports. For example, the one or more ports can include a power and control port (e.g., SAMTEC stacker) or a radio frequency (RF) port (e.g., MMSP (Micro-Mode) connector, Corning G4PO connectors, etc.). Examples of the MMSP connector include, but are not limited to, MMSP-3526, MMSP-3268 and MMSP-3514. In some embodiments, the one or more ports are disposed at an open area external to a footprint of the antenna circuit chip 730.

The antenna array 700 is arranged on a mounting surface 705 that is optionally provided by the antenna board. In some embodiments, each antenna unit 720 is electrically coupled to at least one of the antenna board and/or other antenna units 720 disposed on the mounting surface 705. In some embodiments, the antenna board includes connectors configured to electrically couple to the one or more ports of an antenna unit 720.

In some embodiments, each antenna unit 720 further includes a coolant port, and the coolant port is disposed at an open area of the antenna unit 720 and configured to let a coolant (e.g., air, water) enter and exit the antenna unit 720 to cool the antenna unit 720.

Example Antenna Unit

Figure 8A:
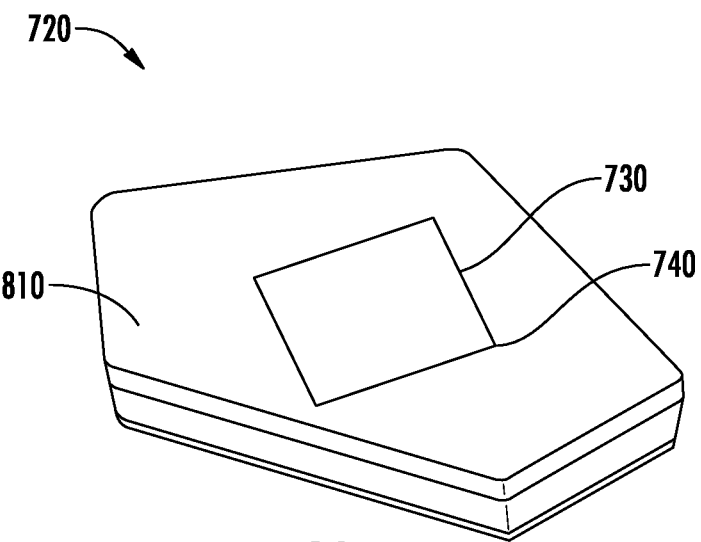
FIGS. 8A-B are perspective views an antenna unit, in accordance with some embodiments, respectively.
Figure 8B:
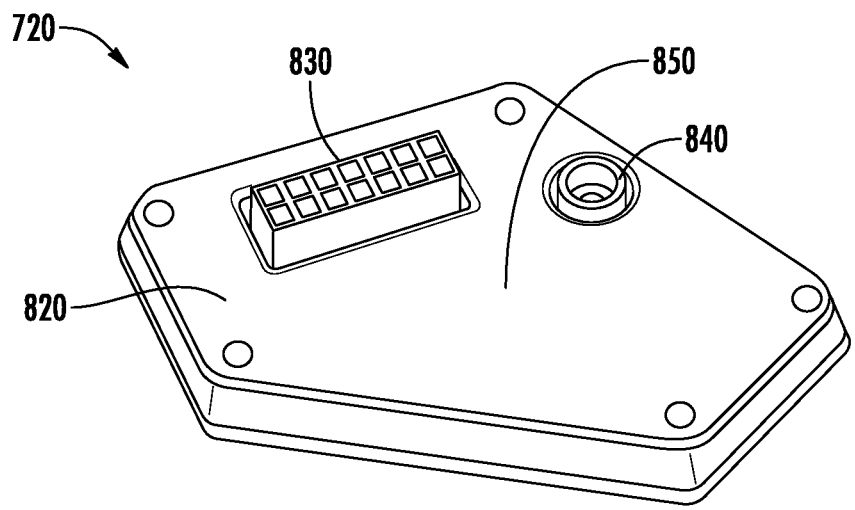

FIGS. 8A-B are perspective views an antenna unit 720, in accordance with some embodiments, respectively.

FIG. 8A shows aperture side 810 of the antenna unit 720. In the antenna unit 720, the one or more antenna elements of the antenna unit 720 are coupled to an antenna circuit chip 730 that includes a subset or all of a radio frequency (RF) front end (i.e., a transmitter/receiver chip). The RF front end includes a RF transmitter front end and an RF receiver front end. In some situations, the RF front end of the antenna circuit chip 730 generates one or more electrical signals and drives the antenna elements of the antenna unit 720 to emit electromagnetic waves in space. Conversely, in some embodiments, the antenna elements of the antenna unit 720 receive one or more electromagnetic waves from free space and converts the electromagnetic waves to an RF electrical signal that can be processed by the RF Frontend on the antenna circuit chip 730.

In some embodiments, the subset of the RF front ends of the antenna circuit chip 730 are configured for adjusting phase, time delay, and/or relative magnitudes of different signals. Specifically, the antenna circuit chip 730 including the RF front end has one or more of: low pass filters (LPF), intermediate frequency (IF) filters, power amplifiers, oscillators, mixers, digital-to-analog converters (DAC), and analog-to-digital converters (ADC). Additionally, in some embodiments, the antenna circuit chip 730 further includes a power management integrated circuit (PMIC) and/or a baseband circuit in addition to the RF front end. The PMIC is configured to manage power for the antenna unit 720, and the baseband circuit is configured to provide low frequency signals that carry information to be transmitted by the antenna element(s) of the antenna unit 720 and process low frequency signals converted from RF signals received by the antenna element(s). Conversely, in some embodiments, the PMIC, the baseband circuit, and a subset of the RF front end are not integrated on the antenna circuit chip 730, and however, are optionally contained in an additional space of the antenna unit 720 that does not overlap a footprint of the antenna circuit chip 730.

In an example, the antenna circuit chip 730 includes an amplifier chip, e.g., a power amplifier, a low noise amplifier. In some embodiments, each antenna circuit chip 730 includes one or more antenna elements 740.

FIG. 8B shows a connector side 820 of the antenna unit 720 that is opposite an aperture side 810. In some embodiments, the connector side 820 of the antenna unit 720 includes one or more ports and a heat sink 850. The one or more ports include a power and control port (e.g., SAMTEC stacker 830) or an RF port (e.g., MMSP 840). In some embodiments, the power and control port and the RF port can be a single port (which requires signal isolation among different types of signals, e.g., between RF signals and digital control signals). Any different number of ports can be used depending on the use case.

The heat sink 850 is configured to absorb and dissipate heat generated by the internal components of the antenna unit 720 (e.g., heat generated by the RF front end). In some embodiments, the heat sink 850 is air cooled when the air is circulated over the connector side 820 of the antenna unit 720. Alternatively, in some embodiments, the antenna unit 720 includes one or more cooling ports (e.g., an inlet and an outlet) configured to cool the antenna unit 720 in a controlled manner using a coolant.

While exemplary illustrations of RF modules are illustrated herein, various other embodiments including RF modules that have different configurations, such as varying the number of input ports and the number of output ports. In an exemplary embodiment, a RF module may have three of more input ports and may have 2 or more output ports.

Example Systems and Apparatuses

Figure 9:
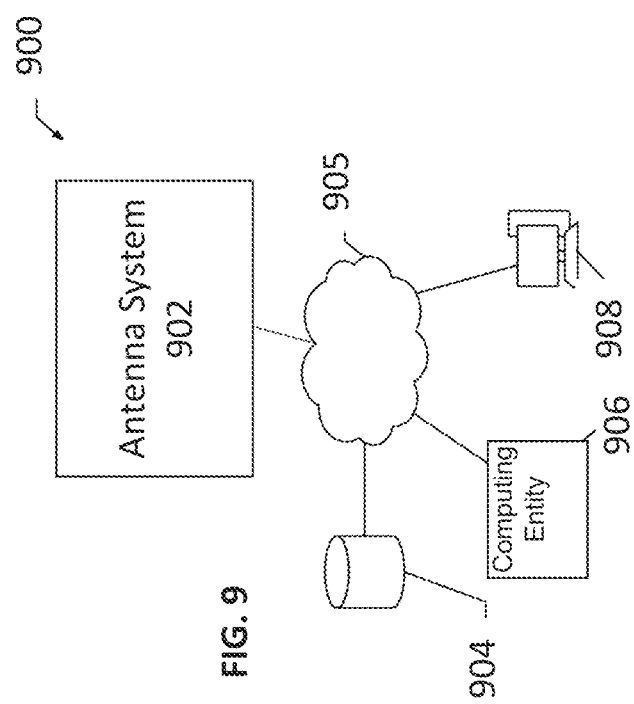
FIG. 9 is a schematic diagram depicting an example system in accordance various embodiments of the present disclosure.

FIG. 9 is a schematic diagram depicting an example system 900 in accordance various embodiments of the present disclosure is provided. As depicted, the example system 900 includes an antenna system 902, one or more computing entities 906 (e.g., servers), one or more databases 904, one or more networks 905, one or more user computing entities 908, and/or the like. In various examples, the system 900 can operate to receive, transmit, and interpret radio signals using an antenna array. The antenna system 902 can include at least one at least one processor and at least one memory coupled to the at least one processor. For example, at least one processor and at least one memory coupled to the at least one processor can be included in an antenna unit (e.g., circuit chips) of the antenna system 902 as described herein.

The one or more computing entities 906, the antenna system 902, the one or more databases 904, and/or the one or more user computing entities 908 are in electronic communication with each other over the one or more networks 905 such that they can exchange data (e.g., receive and transmit data) with one another (e.g., periodically and/or in response to requests). Each of the components of the system 900 can be in communication with one another over the same or different wireless or wired networks 905 including, for example, a wired or wireless Personal Area Network (PAN), Local Area Network (LAN), Metropolitan Area Network (MAN), Wide Area Network (WAN), cellular network, and/or the like. While FIG. 9 illustrates certain system components as separate, standalone devices, the various embodiments are not limited to this particular architecture.

As depicted in FIG. 9, the example system 900 includes one or more computing entities 906. In general, the terms computing device, entity, device, system, and/or similar words used herein interchangeably can refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes can include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 906 can also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 906 can further include or be in communication with non-volatile media (also referred to as non-volatile storage, memory, memory storage, memory circuitry and/or similar terms used herein interchangeably). In one embodiment, the non-volatile storage or memory can include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media can store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably can refer to a structured collection of records or information/data that is stored in a computer-readable storage medium, such as via a relational database, hierarchical database, and/or network database.

In one embodiment, the computing entity 906 can further include or be in communication with volatile media (also referred to as volatile storage, memory, memory storage, memory circuitry and/or similar terms used herein interchangeably). In one embodiment, the volatile storage or memory can also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media can be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like can be used to control certain aspects of the operation of the computing entity 906 with the assistance of the processing element and the operating system.

As indicated, in one embodiment, the computing entity 906 can also include one or more network and/or communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 906 can be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 9× (9×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802. 9 9 (Wi-Fi), Wi-Fi Direct, 802. 96 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 906 can use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 906 components can be located remotely from other computing entity 906 components, such as in a distributed system. Furthermore, one or more of the components can be aggregated and additional components performing functions described herein can be included in the computing entity 906. Thus, the computing entity 906 can be adapted to accommodate a variety of needs and circumstances, such as including various components described with regard to a mobile application executing on the user computing entity 908, including various input/output interfaces.

As depicted in FIG. 9, the system 900 includes a user computing entity 908. In various embodiments, the user computing entity 908 can be or include one or more mobile devices, wearable computing devices, and/or the like. An example user computing entity 908 can include an antenna, a transmitter (e.g., radio), a receiver (e.g., radio), and a processing element that provides signals to and receives signals from the transmitter and receiver, respectively. The signals provided to and received from the transmitter and the receiver, respectively, can include signaling information/data in accordance with an air interface standard of applicable wireless systems to communicate with various devices, such as a computing entity (e.g., central server), another user computing entity 908, and/or the like. In an example embodiment, the transmitter and/or receiver are configured to communicate via one or more SRC protocols. For example, the transmitter and/or receiver can be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver can be configured to communicate via one or more long range protocols, such as GPRS, UMTS, CDMA200, 9×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 908 can also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 908 can be capable of operating with one or more air interface standards, communication protocols, modulation types, and access types. More particularly, the user computing entity 908 can operate in accordance with any of a number of wireless communication standards and protocols. In a particular embodiment, the user computing entity 908 can operate in accordance with multiple wireless communication standards and protocols, such as GPRS, UMTS, CDMA200, 9×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 908 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 908 can also download changes, add-ons, and updates, for instance, to its firmware, software (e.g., including executable instructions, applications, program modules), and operating system.

The user computing entity 908 can include a user interface device comprising one or more user input/output interfaces (e.g., a display and/or speaker/speaker driver coupled to a processing element and a touch interface, keyboard, mouse, and/or microphone coupled to a processing element). For example, the user interface can be configured to provide a mobile application, browser, interactive user interface, dashboard, webpage, and/or similar words used herein interchangeably executing on and/or accessible via the user computing entity 908 to cause display or audible presentation of information/data and for user interaction therewith via one or more user input interfaces. Moreover, the user interface can include or be in communication with any of a number of devices allowing the user computing entity 908 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 908 and can include a full set of alphabetic keys or set of keys that can be activated to provide a full set of alphanumeric keys. In addition to providing input, the user input interface can be used, for example, to activate or deactivate certain functions, such as screen savers and/or sleep modes. Through such inputs the user computing entity 908 can capture, collect, store information/data, user interaction/input, and/or the like.

The user computing entity 908 can also include volatile storage or memory and/or non-volatile storage or memory, which can be embedded and/or can be removable. For example, the non-volatile memory can be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory can be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 908.

As depicted in FIG. 9, any two or more of the illustrative components of the system 900 of FIG. 9 can be configured to communicate with one another via one or more networks 905. The networks 905 can include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 905 can have any suitable communication range associated therewith and can include, for example, global networks (e.g., the Internet), MANs, WANs, LANs, or PANs. In addition, the networks 905 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 9 provides an example system 900, it is noted that the scope of the present disclosure is not limited to the example shown in FIG. 9. In some examples, the system 900 can include one or more additional and/or alternative elements, and/or can be different from that illustrated in FIG. 9.

Figure 10:
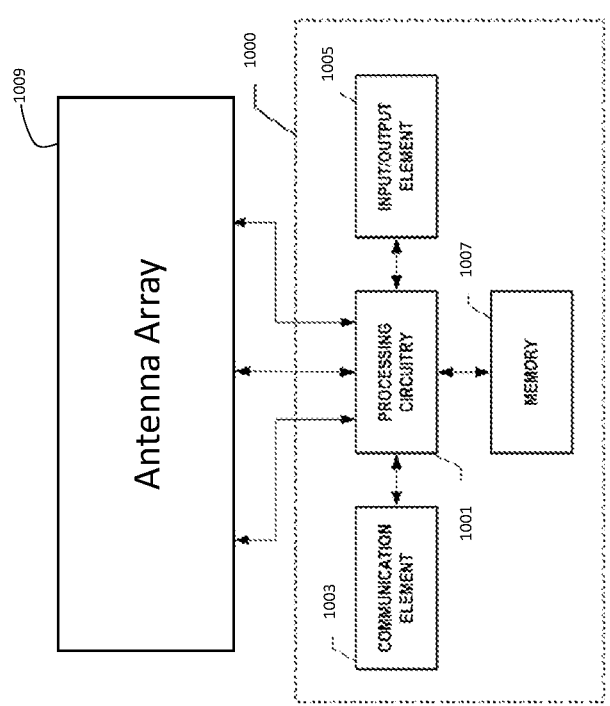
FIG. 10 is a schematic diagram depicting an example antenna controller component in electronic communication with an antenna array in accordance with various embodiments of the present disclosure.

Referring now to FIG. 10, a schematic diagram depicting an example antenna controller component 1000 in electronic communication with an antenna array 1009 in accordance with various embodiments of the present disclosure is provided. As shown, the controller component 1000 comprises processing circuitry 1001, a communication element 1003, input/output element 1005, a memory 1007 and/or other components configured to perform various operations, procedures, functions or the like described herein.

In some embodiments, the controller component 1000 can be or comprise a printed circuit board (PCB). In some examples, the controller component 1000 can further comprise one or more user interfaces, one or more protection circuits, configuration management circuitry, a wireless interface, an interface connector, power control circuitry, and/or the like.

The processing circuitry 1001 can be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 10 as a single processor, in an embodiment, the processing circuitry 1001 can include a plurality of processors and signal processing modules. The plurality of processors can be embodied on a single electronic device or can be distributed across a plurality of electronic devices collectively configured to function as the circuitry of an antenna system (e.g., antenna system 902 of FIG. 9). The plurality of processors can be in operative communication with each other and can be collectively configured to perform one or more functionalities of the circuitry of the antenna system as described herein. In an example embodiment, the processing circuitry 1001 can be configured to execute instructions stored in the memory 1007 or otherwise accessible to the processing circuitry 1001. These instructions, when executed by the processing circuitry 1001, can cause the circuitry of the antenna system to perform one or more of the functionalities, as described herein.

Whether configured by hardware, firmware/software methods, or by a combination thereof, the processing circuitry 1001 can include an entity capable of performing operations according to embodiments of the present disclosure while configured accordingly. Thus, for example, when the processing circuitry 1001 is embodied as an ASIC, FPGA or the like, the processing circuitry 1001 can include specifically configured hardware for conducting one or more operations described herein. Additionally, or alternatively, when the processing circuitry 1001 is embodied as an executor of instructions, such as can be stored in the memory 1007, the instructions can specifically configure the processing circuitry 1001 to perform one or more algorithms and operations described herein.

Thus, the processing circuitry 1001 used herein can refer to a programmable microprocessor, microcomputer or multiple processor chip or chips that can be configured by software instructions (applications) to perform a variety of functions, including the functions of the various embodiments described above. In some devices, multiple processors can be provided dedicated to wireless communication functions and one processor dedicated to running other applications. Software applications can be stored in the internal memory before they are accessed and loaded into the processors. The processors can include internal memory sufficient to store the application software instructions. In many devices, the internal memory can be a volatile or nonvolatile memory, such as flash memory, or a combination thereof. The memory can also be located internal to another computing resource (e.g., enabling computer readable instructions to be downloaded over the Internet or another wired or wireless connection).

The memory 1007 can include suitable logic, circuitry, and/or interfaces that are adapted to store a set of instructions that is executable by the processing circuitry 1001 to perform predetermined operations. Additionally, or alternately, the memory 1007 can be configured to store data/information, application programs, instructions, etc., so that the controller component 1000 can execute various functions according to the embodiments of the present disclosure. For example, in at least some embodiments, the memory 1007 is configured to cache input data for processing by the processing circuitry 1001. Thus, in at least some embodiments, the memory 1007 is configured to store program instructions for execution by the processing circuitry 1001. The memory 1007 can store information in the form of static and/or dynamic information. When the functions are executed, the stored information can be stored and/or used by the controller component 1000. Example memory embodiments can include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 1007 can be integrated with the processing circuitry 1001 on a single chip, without departing from the scope of the disclosure.

The communication element 1003 can be implemented as any apparatus included in a circuit, hardware, a computer program product, or a combination thereof, which is configured to receive and/or transmit data from/to another component or apparatus. The computer program product comprises computer-readable program instructions stored on a computer-readable medium (for example, the memory 1007) and executed by a processing component 1000 (for example, the processing circuitry 1001). In some embodiments, the communication element 1003 (as with other components discussed herein) can be at least partially implemented as the processing circuitry 1001 or otherwise controlled by the processing circuitry 1001. In this regard, the communication element 1003 can communicate with the processing circuitry 1001, for example, through a bus. The communication element 1003 can comprise, for example, antennas, transmitters, receivers, transceivers, network interface cards and/or supporting hardware and/or firmware/software and is used for establishing communication with another apparatus. The communication element 1003 can be configured to receive and/or transmit any data that can be stored by the memory 1007 by using any protocol that can be used for communication between apparatuses. The communication element 1003 can additionally or alternatively communicate with the memory 1007, the input/output element 1005 and/or any other component of the processing component 1000, for example, through a bus.

In some embodiments, the processing component 1000 can comprise an input/output element 1005. The input/output element 1005 can communicate with the processing circuitry 1001 to receive instructions input by the user and/or to provide audible, visual, mechanical, or other outputs to the user. Therefore, the input/output element 1005 can comprise supporting devices, such as a keyboard, a mouse, a display, a touch screen display, and/or other input/output mechanisms. Alternatively, at least some aspects of the input/output element 1005 can be implemented on a device used by the user to communicate with the processing component 1000. The input/output element 1005 can communicate with the memory 1007, the communication element 1003 and/or any other component, for example, through a bus. One or a plurality of input/output modules and/or other components can be included in the processing component 1000.

As described herein, and as will be appreciated, embodiments of the present disclosure may be configured as systems, apparatuses, methods, and the like. Accordingly, embodiments may comprise various means including entirely of hardware or any combination of software and hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

CONCLUSION

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A computing system, comprising:
   a mounting surface, the mounting surface comprising:
      an antenna disposed at an antenna position of the mounting surface, and
      a motion sensor disposed at a sensor position of the mounting surface;
   at least one processor; and
   at least one memory coupled to the at least one processor, wherein the at least one processor is configured to:
   receive motion data generated by the motion sensor;
   compute, based on the motion data, a location offset for the motion sensor from the sensor position of the mounting surface;
   compute a deformed position of the antenna based on the location offset for the motion sensor; and
   update, based on the deformed position, a signal model associated with the antenna.

2. The computing system of claim 1, wherein computing the deformed position comprises:
   computing an affine transformation matrix for the mounting surface based on the sensor position and the location offset for the motion sensor.

3. The computing system of claim 2, wherein computing the deformed position further comprises:
   computing a homography transformation matrix for the mounting surface based on the sensor position and the location offset for the motion sensor.

4. The computing system of claim 3, wherein computing the deformed position further comprises:
   computing the deformed position of the antenna using a combination of the affine transformation matrix and the homography transformation matrix.

5. The computing system of claim 1, wherein the mounting surface comprises a plurality of motion sensors, each disposed at a different sensor position of a plurality of sensor positions on the mounting surface.

6. The computing system of claim 5, wherein the mounting surface defines a two-dimensional surface and each of the plurality of sensor positions are equally separated at an exterior portion of the two-dimensional surface.

7. The computing system of claim 5, wherein the mounting surface defines a three-dimensional surface and the plurality of sensor positions comprise one or more exterior sensor positions, one or more center sensor positions, and one or more interior sensor positions between the one or more center sensor positions and the one or more exterior sensor positions.

8. The computing system of claim 7, wherein computing the deformed position of the antenna based on the location offset for the motion sensor, comprises:
   computing a homography transformation for the mounting surface by applying a feature matching algorithm to the plurality of sensor positions and a respective offset of each of the plurality of motion sensors from a respective sensor position.

9. The computing system of claim 1, wherein the mounting surface is associated with a phased antenna array comprising a plurality of antenna, each disposed at a respective antenna position on the mounting surface.

10. The computing system of claim 9, wherein the at least one processor is configured to:
    modify a phased array signal processing algorithm using the signal model to account for the deformed position of the antenna.

11. The computing system of claim 10, wherein the phased array signal processing algorithm comprises a signal transmission algorithm configured to control a directionality of a radio transmission.

12. The computing system of claim 10, wherein the phased array signal processing algorithm comprises a signal reception algorithm configured to control a directionality of a radio reception.

13. The computing system of claim 10, wherein the phased array signal processing algorithm comprises at least one of: (i) a direction of departure algorithm; or (ii) a direction of arrival algorithm.

14. An antenna array comprising:
    a mounting surface;
    a plurality of antennas disposed on the mounting surface;
    a plurality of motion sensors disposed on the mounting surface; and
    signal processing circuitry configured to process radio signals using a signal model that is updated based on a deformed position of an antenna of the plurality of antennas, wherein the deformed position is based on a location offset of at least one of the plurality of motion sensors.

15. The antenna array of claim 14, wherein the plurality of motion sensors comprise a plurality of inertial measurement units, each comprising at least one of: (i) an accelerometer, (ii) a gyroscope, or (iii) a magnetometer.

16. The antenna array of claim 14, wherein the location offset is based on motion data from the plurality of motion sensors that is indicative of a deformation of the mounting surface.

17. The antenna array of claim 14, wherein the mounting surface defines a two-dimensional surface with at least four corners, and wherein the plurality of motion sensors comprise at least one motion sensor located at each of the at least four corners.

18. The antenna array of claim 14, wherein the mounting surface defines a three-dimensional surface with an exterior portion and a center portion, and wherein the plurality of motion sensors comprise a first motion sensor located within the exterior portion and a second motion sensor located within the center portion.

19. A method comprising:
   receiving motion data generated by a motion sensor;
   computing, based on the motion data, a location offset for the motion sensor from a sensor position on a mounting surface;
   computing a deformed position for an antenna disposed on the mounting surface based on the location offset for the motion sensor; and
   updating, based on the deformed position, a signal model associated with the antenna.

20. The method of claim 19, wherein computing the deformed position for the antenna disposed on the mounting surface based on the location offset for the motion sensor, comprises:
   computing an affine transformation for the mounting surface based on the sensor position and the location offset for the motion sensor from the sensor position on the mounting surface;
   computing a homography transformation for the mounting surface based on the sensor position and the location offset for the motion sensor from the sensor position on the mounting surface; and
   computing the deformed position of the antenna based on a combination of the affine transformation and the homography transformation.

\* \* \* \* \*